(12) United States Patent
Earl et al.

(10) Patent No.: US 12,027,732 B2
(45) Date of Patent: Jul. 2, 2024

(54) FUEL CELL TEMPERATURE CONTROL

(71) Applicant: Sapphire Technologies, Inc., Cerritos, CA (US)

(72) Inventors: Jeffrey Earl, Hermosa Beach, CA (US); Freddie Sarhan, Cerritos, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

(21) Appl. No.: 17/659,744

(22) Filed: Apr. 19, 2022

(65) Prior Publication Data
US 2023/0335763 A1     Oct. 19, 2023

(51) Int. Cl.
| | |
|---|---|
| H01M 8/04 | (2016.01) |
| B60L 58/33 | (2019.01) |
| H01M 8/04007 | (2016.01) |
| H01M 8/04014 | (2016.01) |
| H01M 8/04089 | (2016.01) |
| H01M 8/0432 | (2016.01) |
| H01M 8/04701 | (2016.01) |
| H01M 8/04746 | (2016.01) |

(52) U.S. Cl.
CPC ......... *H01M 8/04067* (2013.01); *B60L 58/33* (2019.02); *H01M 8/04014* (2013.01); *H01M 8/04089* (2013.01); *H01M 8/04365* (2013.01); *H01M 8/04708* (2013.01); *H01M 8/04753* (2013.01); *B60L 2220/14* (2013.01); *H01M 2220/20* (2013.01)

(58) Field of Classification Search
CPC ......... H01M 8/04067; H01M 8/04014; H01M 8/04089; H01M 8/04365; H01M 8/04708
See application file for complete search history.

(56) References Cited

U.S. PATENT DOCUMENTS

| | | | |
|---|---|---|---|
| 5,523,176 A | 6/1996 | Fonda-Bonardi | |
| 5,948,221 A | 9/1999 | Hsu | |

(Continued)

FOREIGN PATENT DOCUMENTS

| | | |
|---|---|---|
| CN | 107178424 | 9/2017 |
| CN | 111342082 | 6/2020 |
| JP | 2006-147246 | 6/2006 |

OTHER PUBLICATIONS

International Search Report and Written Opinion in International Appln. No. PCT/US2023/019146, dated Jul. 31, 2023, 12 pages.

*Primary Examiner* — Olatunji A Godo
(74) *Attorney, Agent, or Firm* — Fish & Richardson P.C.

(57) ABSTRACT

A fuel cell system includes a gas fuel source, a fuel cell stack fluidly connected to the gas fuel source by a first pathway, and a turboexpander generator fluidly connected to the gas fuel source by a bypass fluid pathway in parallel with at least a portion of the first pathway. The first pathway transmits a first amount of gas fuel from the gas fuel source to the fuel cell stack. The turboexpander generator receives a second amount of gas fuel from the gas fuel source and reduces a pressure and temperature of the second amount of the gas fuel. The fuel cell system also includes a motor electrically connected to the fuel cell stack and the turboexpander generator, where the fuel cell stack and the turboexpander generator each supply electrical power to the motor.

18 Claims, 3 Drawing Sheets

(56) References Cited

U.S. PATENT DOCUMENTS

| | | | |
|---|---|---|---|
| 6,628,006 B2* | 9/2003 | Oglesby | B60L 58/30 |
| | | | 290/1 R |
| 7,638,892 B2 | 12/2009 | Myers et al. | |
| 7,841,306 B2 | 11/2010 | Myers et al. | |
| 8,146,360 B2 | 4/2012 | Myers et al. | |
| 8,384,232 B2 | 2/2013 | Myers et al. | |
| 8,400,005 B2 | 3/2013 | Huber et al. | |
| 8,739,538 B2 | 6/2014 | Myers et al. | |
| 8,839,622 B2 | 9/2014 | Myers et al. | |
| 2012/0013125 A1 | 1/2012 | Myers et al. | |
| 2018/0342877 A1 | 11/2018 | Yoo et al. | |
| 2019/0312288 A1 | 10/2019 | Tsubouchi | |
| 2021/0245629 A1* | 8/2021 | Klimpel | B60L 58/33 |
| 2022/0158203 A1* | 5/2022 | Pratap | H01M 8/04022 |
| 2022/0200024 A1* | 6/2022 | Kim | H01M 8/04753 |

* cited by examiner

┌─────────────────────────────────────────────────────────┐
│ Directing, with a first pathway, a first amount of a    │─302
│ gas fuel from a fuel source to a fuel cell stack        │
└─────────────────────────────────────────────────────────┘
                            │
                            ▼
┌─────────────────────────────────────────────────────────┐
│ Directing, with a bypass pathway in parallel with at    │─304
│ least a portion of the first pathway, a second amount   │
│ of the gas fuel from the fuel source to a turboexpander │
│ generator                                               │
└─────────────────────────────────────────────────────────┘
                            │
                            ▼
┌─────────────────────────────────────────────────────────┐
│ Reducing a pressure and temperature of the second       │─306
│ amount of gas fuel with the turboexpander generator     │
└─────────────────────────────────────────────────────────┘
                            │
                            ▼
┌─────────────────────────────────────────────────────────┐
│ Providing a first portion of generated power from the   │─308
│ fuel cell stack to a motor electrically connected to    │
│ the fuel cell stack                                     │
└─────────────────────────────────────────────────────────┘
                            │
                            ▼
┌─────────────────────────────────────────────────────────┐
│ Providing a second portion of generated power from the  │─310
│ turboexpander generator to the motor electrically       │
│ connected to the turboexpander generator                │
└─────────────────────────────────────────────────────────┘
```

FIG. 3

FUEL CELL TEMPERATURE CONTROL

TECHNICAL FIELD

This disclosure relates to temperature control systems for fuel cells.

BACKGROUND

A fuel cell is an electrochemical cell that converts the chemical energy of a fuel, e.g., hydrogen, and an oxidizing agent, e.g., air or oxygen, into electricity. Fuel cells can be used in vehicles as a source of electricity for motive power, for example, to power cars, trucks, trains, ships, airplanes and other land, sea and air vehicles.

SUMMARY

This disclosure describes fuel cell systems, such as hydrogen fuel cell systems for vehicles.

In some aspects, a fuel cell system includes a gas fuel source, a fuel cell stack fluidly connected to the gas fuel source by a first pathway, where the first pathway transmits a first amount of gas fuel from the gas fuel source to the fuel cell stack, and a turboexpander generator fluidly connected to the gas fuel source by a bypass pathway in parallel with at least a portion of the first pathway. The turboexpander generator receives a second amount of gas fuel from the gas fuel source and reduces a pressure and temperature of the second amount of the gas fuel. The fuel cell system includes a motor electrically connected to the fuel cell stack and the turboexpander generator, where the fuel cell stack and the turboexpander generator each supply electrical power to the motor.

This, and other aspects, can include one or more of the following features. The turboexpander generator can include a turbine wheel to receive the second amount of the gas fuel and rotate in response to expansion of the second amount of the gas fuel flowing into an inlet of the turbine wheel and out of an outlet of the turbine wheel, a rotor coupled to the turbine wheel to rotate with the turbine wheel, a stationary stator, where the turboexpander generator generates an alternating current upon rotation of the rotor within the stator, and a power electronics system electrically connected to an electrical output of the stationary stator to receive alternating current from the stationary stator. The power electronics system can be electrically connected to the motor to provide the alternating current to the motor. The power electronics system can include a variable speed drive to control the alternating current to the motor. The fuel cell system can further include a controller communicably coupled to the gas fuel source, the controller to control the first amount of gas fuel directed to the fuel cell stack and the second amount of gas fuel directed to the turboexpander generator. The bypass pathway can be fluidly coupled to the first pathway downstream of the turboexpander generator, the bypass pathway to return the second amount of the gas fuel from the turboexpander generator to the first pathway. The bypass pathway downstream of the turboexpander generator can be fluidly connected to a heat exchange system, the heat exchange system to cool the fuel cell stack. The heat exchange system can include a coolant pump and a heat exchanger, the second amount of the gas fuel to cool a coolant fluid of the heat exchange system. The fuel cell stack can include a proton-exchange membrane fuel cell. The first pathway can include a pressure reduction valve to reduce a pressure of the first amount of the gas fuel. The gas fuel source can include a hydrogen tank, and the gas fuel can include hydrogen.

Some aspects of the disclosure encompass a method for providing fuel to a fuel cell stack. The method includes directing, with a first pathway, a first amount of a gas fuel from a fuel source to a fuel cell stack, directing, with a bypass pathway in parallel with at least a portion of the first pathway, a second amount of the gas fuel from the fuel source to a turboexpander generator, reducing a pressure and temperature of the second amount of gas fuel with the turboexpander generator, providing a first portion of generated power from the fuel cell stack to a motor electrically connected to the fuel cell stack, and providing a second portion of generated power from the turboexpander generator to the motor electrically connected to the turboexpander generator.

This, and other aspects, can include one or more of the following features. Reducing a pressure and temperature of the second amount of gas fuel with the turboexpander generator can include directing the second amount of gas fuel to a turbine wheel of the turboexpander generator, driving rotation of the turbine wheel with the second amount of gas fuel, and in response to rotating the turbine wheel, generating electrical current by an electric generator of the turboexpander generator. Providing the second portion of generated power from the turboexpander generator to the motor can include directing electrical current generated by the electric generator to a power electronics, and delivering the generated electrical current from the power electronics to the motor. The method can include controlling, with a controller, the first amount of the gas to the fuel cell stack and the second amount of the gas to the turboexpander generator. Controlling the first amount of the gas and the second amount of the gas can include determining the first amount of gas and the second amount of gas based on a temperature of the fuel cell stack. The controlling can include determining that the temperature of the fuel cell stack is above a first temperature threshold, and in response to determining that the temperature is above the first temperature threshold, decreasing the first amount of gas fuel to the fuel cell stack and increasing the second amount of gas fuel to the turboexpander generator. The controlling can include determining that the temperature of the fuel cell stack is below a second temperature threshold, and in response to determining that the temperature is below the second temperature threshold, increasing the first amount of gas fuel to the fuel cell stack and decreasing the second amount of gas fuel to the turboexpander generator. The method can include, after reducing the pressure and temperature of the second amount of gas fuel with the turboexpander generator, directing the second amount of gas fuel to a heat exchange system of the fuel cell stack to cool a coolant fluid of the heat exchange system.

Certain aspects of the disclosure include a fuel cell system for a vehicle. The fuel cell system includes a hydrogen fuel source, a proton-exchange membrane fuel cell stack fluidly connected to the hydrogen fuel source by a first pathway, the first pathway to transmit a first amount of hydrogen fuel from the hydrogen fuel source to the fuel cell stack, and a turboexpander generator fluidly connected to the hydrogen fuel source by a bypass pathway in parallel with at least a portion of the first pathway. The turboexpander generator receives a second amount of hydrogen fuel from the hydrogen fuel source and reduces a pressure and temperature of the second amount of the hydrogen fuel.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements. Drawings not to scale.

DETAILED DESCRIPTION

Fuel cell systems, such as in fuel cell vehicles, store fuel and oxidant for generating electricity in storage vessels. The pressure of the storage vessels is high, for example, in order to fit a large gas quantity in a small volume of space. In some instances, the pressure can be as high as 700 bar-g. Before transferring fuel, such as hydrogen, from a high-pressure vessel to a fuel cell, the pressure of the fuel is reduced. To deliver the fuel safely through pathways and for use in the fuel cell system, the fuel is depressurized to lower levels, often using pressure regulators. In embodiments of fuel cells that utilize hydrogen as fuel, the pressure of the hydrogen is reduced, such as to as low as 16 bar-g. In some examples, the pressure is stepped down at pressure letdown (PLD) stations between the storage vessel and the fuel cell(s) (FC). In a stack of FCs, the reduced-pressure hydrogen is combined with an oxidant (e.g., air), and both electricity and heat is produced from this reaction. The PLD stations use regulating valves to achieve the required pressure drop, but also waste significant amounts of energy in the process. Additional regulating valves can be used at other locations for pressure control. A turboexpander generator can be installed in parallel to the regulating valve(s) to divert all or a portion of fuel flow to a more efficient pressure reduction process at the turboexpander generator, and/or recover the wasted energy from pressure reduction, and produce electrical power. The electrical power can be directed to another component of the fuel cell system, such as a motor or battery, a power grid, or elsewhere. In instance of directing power to a power grid, the grid can include a national, regional, or municipal power grid, or a local grid, for example, for supplying power to a building, campus, and/or industrial manufacturing or processing plant.

Fuel cells have operating temperature thresholds that the fuel cells must stay within in order to operate safely. Fuel cell systems of the present disclosure incorporate a turboexpander generator between the high-pressure vessel and a fuel cell stack to receive all or a portion of the fuel intended for the fuel cell stack, convert the fuel (or fuel portion) to a lower temperature and lower pressure fuel, and return the fuel (or fuel portion) to the fuel pathway that enters the fuel cell stack. Since the portion of the fuel from the turboexpander generator is relatively cooler than a depressurized fuel that flows directly from the storage vessel, the portion of the fuel from the turboexpander generator can also act to dissipate heat in order to cool the fuel cell stack (or other component of a fuel cell system). The turboexpander generator also generates electricity as a result of the de-pressurization of the fuel portion, and can provide that generated electricity to the motor, battery, or another electrical component of the fuel cell system.

The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from gas fuel pressure letdown applications, the turboexpander can generate electricity while also reducing CO2 emissions, increasing overall efficiency, offsetting electrical costs, and generating additional electricity (e.g., additional revenue).

In some implementations, such as in long haul hydrogen vehicles, the flow rate of hydrogen can be calculated to be about 4.667 kilograms-hydrogen per hour (kg-hydrogen/hr), for example, for a 1,200 kilometer (km) range at 80 km per hour (km/hr) average speed with a 70 kg-hydrogen vessel capacity at 20 degrees Celsius (C). For these parameters, the isentropic power potential of onboard hydrogen expansion can be calculated as 3.817 kilowatts (kW) at an isentropic outlet temperature of approximately −185 C). This low-pressure hydrogen is mixed with air (e.g., oxygen) in the fuel cell (FC) of the vehicle, such as a proton-exchange membrane (PEM) FC, and both electricity and heat are produced from this reaction. In some examples, the safe operating temperature of PEMFCs is just under 100 C, and heat must be dissipated from the PEMFC to ensure safe operation. The cold, expanded hydrogen out of the turboexpander can be used to dissipate the heat directly at the PEMFC or at a heat exchanger system connected to the PEMFC.

Figure 1:
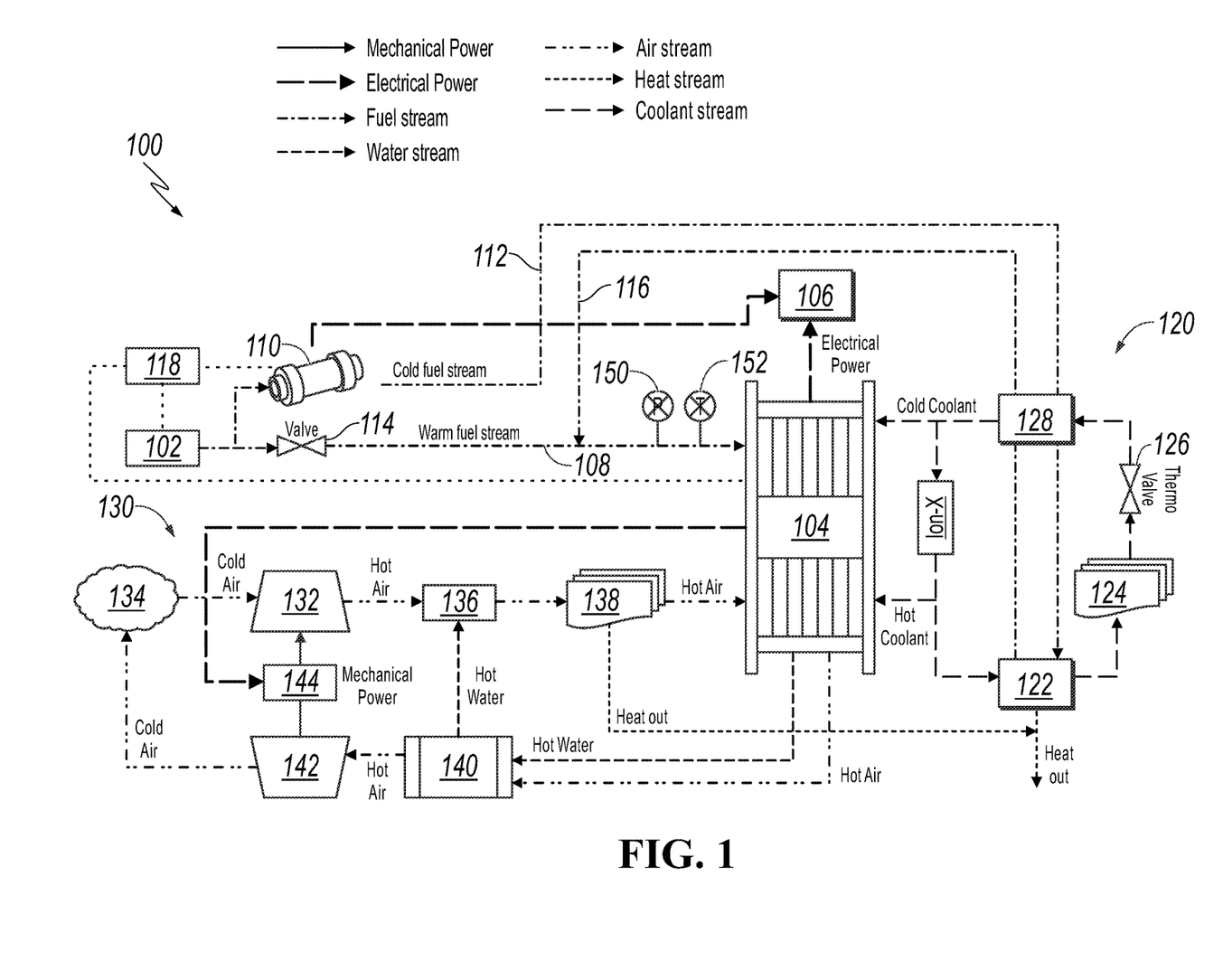
FIG. 1 is a schematic diagram of an example fuel cell system.

FIG. 1 is a schematic diagram of an example fuel cell system 100 that can be used in a variety of fuel cell applications, such as in transportation equipment, material handling, and power generators. For example, the fuel cell system 100 of FIG. 1 includes components of a fuel cell vehicle, such as a hydrogen fuel cell vehicle that uses hydrogen as fuel to produce electricity.

The example fuel cell system 100 includes a fuel supply 102, a fuel cell stack 104 including one or more FCs, a drive motor 106, a fluid pathway 108 extending between the fuel supply 102 and the fuel cell stack 104, and a turboexpander generator 110 along a bypass pathway 112 that runs parallel to a portion of the fluid pathway 108. The fuel supply 102 includes a gas fuel source, such as a hydrogen gas tank, that fluidly connects to the fuel cell stack 104 via the fluid pathway 108. The fluid pathway 108 includes one or more valves and/or pressure regulators (one valve 114 shown) to control the flow of hydrogen gas to the fuel cell stack 104. The valve 114 is a pressure reduction valve that acts to release pressure from the flow of hydrogen gas to lower the pressure of the hydrogen gas to a more controllable pressure level that the fuel cell stack 104 can accept. Although only one valve 114 is shown in the example fuel cell system 100 of FIG. 1, the fluid pathway 108 can include more than one valve, in sequence or in series or both, to reduce the pressure of the hydrogen gas to a desired pressure level.

The turboexpander generator 110 resides in the bypass line 112 in parallel with the valve(s) 114, and the turboexpander generator 110 is fluidly connected to the fuel supply 102 via the bypass line 112. The bypass line 112 connects to the fluid pathway 108 upstream of the valve 114 to receive a portion of the fuel diverted from a primary flow of the fuel from the fuel supply 102. In some instances, the bypass line 112 connects directly to the fuel supply 102, for example, without connecting to the fluid pathway 108 upstream of the valve 114.

During operation of the example fuel cell system 100, a first amount of fuel from the fuel supply 102 is directed to the fuel cell stack 104 via the fluid pathway 108. A second amount of fuel from the fuel supply 102 is directed to the turboexpander generator 110 via the bypass line 112 that connects to the fluid pathway 108 or connects directly to the fuel supply 102 itself. The valve 114 (and/or other valves and pressure regulators) reduce the pressure of the first amount of fuel, and direct the first amount of fuel to the fuel cell stack 104 via a downstream portion of the fluid pathway 108. The turboexpander generator 110 receives the second amount of the fuel and reduces a pressure and a temperature of the second amount of fuel through a pressure reducing turbine system, described in greater detail later. The turboexpander generator includes a turbine section and a generator section that are integrally connected, such that the flow of the second amount of fuel through the turbine section reduces a pressure of the fuel while also operating the generator section to produce an electrical current (e.g., an amount of electrical power) that can be supplied to other portions of the fuel cell system 100, such as the drive motor 106, battery, and/or other electrical systems.

The turboexpander generator 110 outputs the depressurized second amount of fuel at a temperature that is cooler than the first amount of depressurized fuel from the valve 114. For example, the turboexpander generator 110 can output the depressurized second amount of hydrogen fuel at a temperature as low as −185 C. The outlet temperature can be controlled through the design of the turbine wheel of the turboexpander generator 110, described in greater detail below. The depressurized second amount of fuel from the turboexpander generator 110 can be diverted back to the fluid pathway 108 at a location downstream of the valve 114 to join with the depressurized first amount of fuel that then flows to the fuel cell stack 104 to be used as fuel in the fuel cell stack 104.

In some instances, the depressurized second amount of fuel that exits the turboexpander generator 110 is diverted to other component(s) of the fuel cell system 100, for example, to cool other component(s) due to the lower temperature of the second amount of fuel. For example, the example fuel cell system 100 of FIG. 1 includes a heat exchange system 120 including a heater system 122, a radiator 124, a thermo valve 126, and a coolant pump 128 that provides and controls a coolant to the fuel cell stack 104. The heat exchange system 120 controls the temperature of coolant supplied to the fuel cell stack 104 in order to regulate the temperature of the fuel cell stack 104. In some implementations, such as in the example system 100 of FIG. 1, all or a portion of the second amount of fuel from the turboexpander generator 110 is diverted to the heat exchange system 120, such as the heater system 122 or a different component of the heat exchange system 120, to cool the coolant flowing through the heat exchange system 120. For example, the second amount of fuel can be directed through a cooling jacket or sleeve around a coolant pipeline, across a heat sink or other type of heat exchanger that transfers heat from the coolant to the second amount of fuel, or otherwise flows through the heater system 122 to cool the coolant. The second amount of fuel can then be returned to the fluid pathway 108, for example, along bypass return line 116, to rejoin the first amount of fuel being supplied to the fuel cell stack 104.

The second amount of fuel from the turboexpander generator 110 assists in cooling the coolant that flows through the heat exchange system 120, which increases the efficiency of the heat exchange system 120, decreases the required coolant pump size, and/or decreases the amount of coolant required on the heat exchange system. The turboexpander generator 110 does not require additional power to reduce the pressure and temperature of the fuel, and therefore, the cooling aspect of the fuel from the turboexpander generator 110 acts as free energy to cool the coolant and decreases heat lost to the atmosphere. The relatively cooler second amount of fuel from the turboexpander generator 110 acts to dissipate heat from the heat exchange system 120, which improves the efficiency of the heat exchange system 120 without requiring additional energy or additional cooling structures that would otherwise expend additional energy, and also increases electrical power out of the overall fuel cell system 100.

The flow rate and amounts of the first amount of fuel directed to the valve 114 and the second amount of fuel directed to the turboexpander generator 110 is controlled, for example, based on an operating temperature of the fuel cell stack 104. The fuel cell stack 104 operates within an operational temperature range, such as between an upper temperature threshold and a lower temperature threshold. If the temperature of the fuel cell stack 104 approaches, reaches, or drops below the lower temperature threshold, then the first amount of fuel is increased and the second amount of fuel is decreased. This adjustment in the amounts of fuel results in raising the temperature of the fuel cell stack, for example, since the first amount of fuel through the valve 114 has a relatively higher temperature than the second amount of fuel through the turboexpander generator 110, and there is less of the cooler second amount of fuel being used to cool the coolant. If the temperature of the fuel cell stack 104 approaches, reaches, or exceeds the upper temperature threshold, then the first amount of fuel is decreased and the second amount of fuel is increased. This adjustment in the amounts of fuel results in decreasing the temperature of the fuel cell stack, for example, since the first amount of fuel through the valve 114 has a relatively higher temperature than the second amount of fuel through the turboexpander generator 110, and there is more of the cooler second amount of fuel being used to cool the coolant, and thereby, the fuel cell stack 104.

In some implementations, a controller 118 is communicably coupled to the fuel supply 102, fuel cell stack 104, turboexpander generator 110, or a combination of these. The controller 118 determines the amount of fuel directed to the turboexpander generator 110 via the bypass line 112 or directly to the fuel cell stack 104 via the fluid pathway 108, for example, based on the temperature of the fuel cell stack 104. In some examples, the fluid pathway 108 includes a controllable valve at the intersection of the bypass line 112 and the fluid pathway 108 to control the separation of the amounts of fuel. Likewise, the outlet end of the bypass line 112 can connect to the fluid pathway 108 with another controllable valve, a passive one-way valve, or another flow control device, to ensure there is no backflow through the bypass line 112 (or return bypass line 116).

In some instances, the fluid pathway 108 includes a pressure gauge 150 and a temperature gauge 152 at the downstream end of the valve 114 and the turboexpander generator 110. The controller 118 can connect to the pressure sensor 150 and temperature sensor 152 in order to determine the pressure and temperature of the fuel being supplied to the fuel cell stack 104 and take any corrective measures to adjust the temperature and/or pressure of the fuel, for example, by adjusting the first amount of fuel directed to the valve 114 and the second amount of fuel directed to the turboexpander generator 110. The pressure sensor 150 and temperature sensor 152 can be integrally formed into a single sensor, or be separate along the fluid pathway 108. In certain instances, the pressure sensor 150 and temperature sensor 152 are integrated in the fuel cell stack 104 instead of along the fluid pathway 108.

In the example fuel cell system 100 of FIG. 1, the fuel cell stack 104 and the turboexpander generator 110 supplies electrical power to the motor 106. In some instances, the turboexpander generator 110 provides some or all of its generated electrical power to a different component within the system 100 or outside of the system 100, for example, to a battery or other electrical component. The turboexpander generator 110 can include power electronics to receive, control, and distribute the generated power from the generator section of the turboexpander generator 110, for example, using a variable speed drive.

In the example fuel cell system 100 of FIG. 1, the fuel supply 102 is a hydrogen tank that stores and distributes hydrogen fuel, and the fuel cell stack 104 includes one or more proton-exchange membrane (PEM) FCs. Each fuel cell of the PEMFCs includes a membrane, catalyst layers (i.e., anode layer and cathode layer), and gas diffusion layers. The membrane resides between the anode layer and cathode layer of the catalyst layers, and the catalyst layers are surrounded by the gas diffusion layers. The gas diffusion layers reside outside of the catalyst layers and facilitate the transportation of reactants into the catalyst layer and remove the water. The catalyst layers include an anode side and a cathode side, where the anode side enables hydrogen molecules to be split into protons and electrons, and the cathode side enables oxygen reduction by reacting with the protons generated by the anode, producing water. The membrane conducts positively charged ions and blocks electrons, thereby allowing the hydrogen to pass through the membrane in one direction toward the oxygen, while diverting the electrons.

In some instances, the type of fuel in the fuel supply 102 and the type of fuel cell can vary. For example, the fuel can include hydrogen, oxygen, air, or a combination of these. In some examples, the fuel cell system 100 can include multiple fuel supply tanks 102 for one or multiple fuel types, where the fuel cell operator supplies the fuel(s) from storage vessels. As an example, a first fuel supply tank can include hydrogen as a first fuel, and a second fuel supply tank can include oxygen as a second fuel, where the fuel cell operator supplies both the oxygen and the hydrogen from the storage vessels. In certain instances, the fuel cell can include an alkaline fuel cell, phosphoric acid fuel cells, molten carbonate fuel cells (e.g., where the fuel may also be natural gas, biogas, or syngas, and oxygen or air), solid oxide fuel cells (e.g., where the fuel may also be natural gas, biogas, or syngas, and oxygen or air), reversible fuel cells, or a combination of these fuel cell types.

The example fuel cell system 100 can include other components of a fuel cell vehicle. For example, the fuel cell system 100 includes an air supply system 130 that controls the movement of air to and from the fuel cell stack 104 and the movement of water from the fuel cell stack 104. The air supply system 130 includes a compressor 132 to receive atmospheric air 134, a humidifier 136, a heat exchanger 138, a water separator 140, an expander 142, and a motor 144 to drive the compressor 132 and/or expander 142. During operation of the air supply system 130, the compressor 132 receives atmospheric air 134, compresses the air, and directs the compressed air through the humidifier 136. The water separator 140 receives the byproduct water from the fuel cell stack 104, separates the water into hot water and hot air, and directs the hot water to the humidifier 136 and the hot air to the expander 142. The motor 144 drives the expander 142, the compressor 132, or both. The motor 144 can be driven by electrical power from the fuel cell stack 104, the turboexpander generator 110, a battery, or another component of the fuel cell system 100. Cold air from the expander 142 can be expelled to the atmosphere, hot water is directed to the humidifier 136 to be converted to hot air, and the air from the humidifier 136 is directed through the heat exchanger 138 before it is directed to the fuel cell stack 104.

Figure 2:
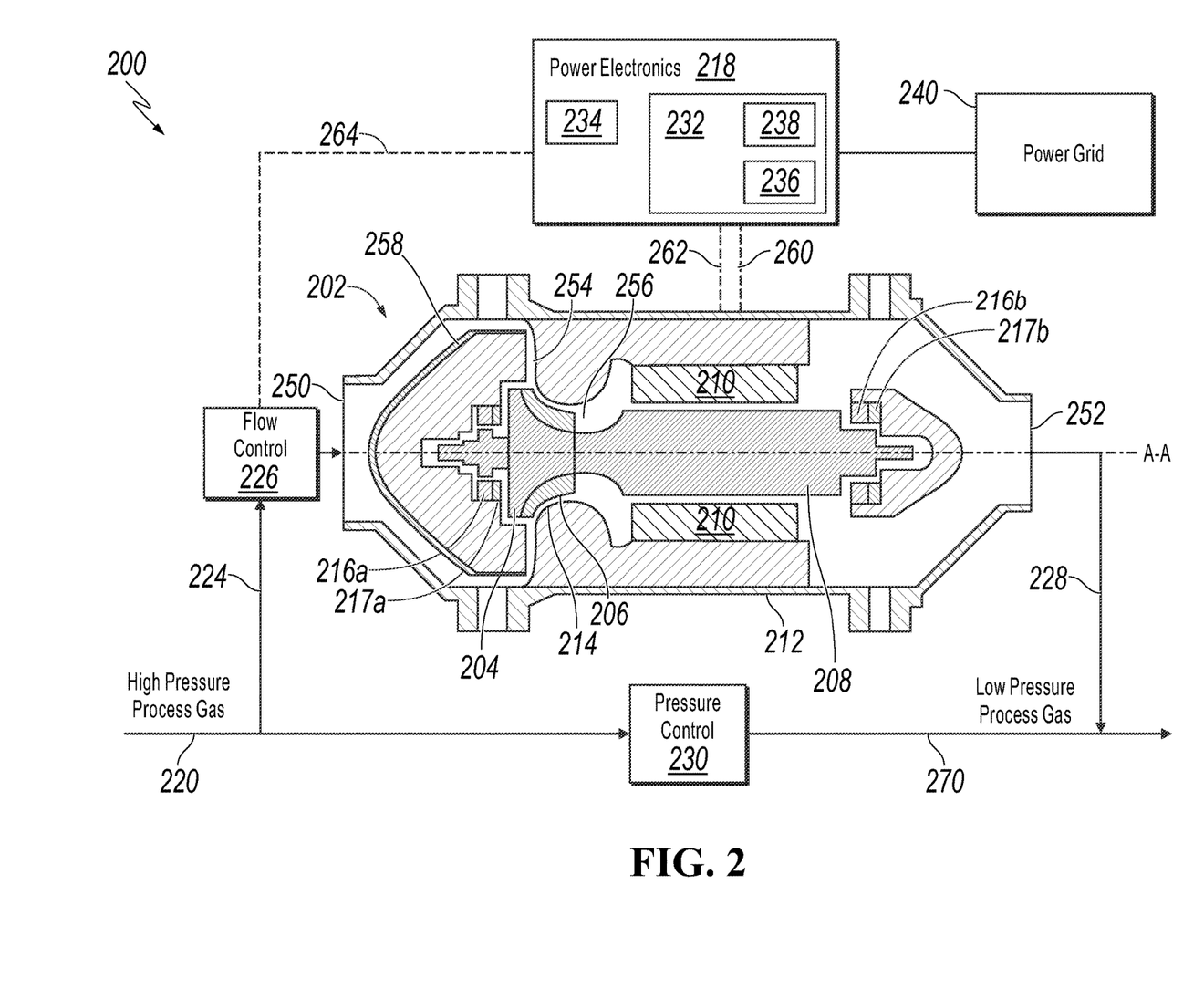
FIG. 2 is a schematic diagram of an example turboexpander generator system coupled to an electrical component, which can be used in the example fuel cell system of FIG. 1.

FIG. 2 is a schematic diagram of an example turboexpander generator system 200 coupled to an electrical component 240. The example turboexpander generator system 200 can be used in the example turboexpander generator 110 of FIG. 1 to receive a portion of fuel 224 (e.g., hydrogen gas) from a total fuel flow 220, depressurize the fuel portion 224, and output the lower pressure fuel portion 228. In other instances, the example turboexpander generator 200 can be added at a PLD station to capture energy from gas expansion from a PLD process, or in any of the other applications described above.

The example turboexpander generator system 200 includes a turboexpander 202 in parallel with a pressure control valve 230 (e.g., valve 114 of FIG. 1). The turboexpander 202 is arranged axially so that the turboexpander 202 can be mounted in-line with a pipe. The turboexpander 202 acts as an electric generator by converting kinetic energy to rotational energy from gas expansion through a turbine wheel 204 and generating electrical energy. For example, rotation of the turbine wheel 204 can be used to rotate a rotor 208 within a stator 210, which then generates electrical energy.

The turboexpander 202 includes a high-performance, high-speed permanent magnet generator with an integrated radial in-flow expansion turbine wheel 204 and low loss active magnetic bearings (AMBs) 216a,b. The rotor assembly includes the permanent magnet section with the turbine wheel 204 mounted directly to the rotor hub of the rotor 208. The rotor 208 is levitated by the magnetic bearing system, for example, at longitudinal ends (e.g., axial ends) of the rotor 208, creating a frictionless (or near frictionless) interface between dynamic and static components. The AMBs 216a,b facilitate a lossless (or near lossless) rotation of the rotor 208.

The turboexpander 202 is designed to have gas fuel flow through the system, which cools the generator section and eliminates the need for auxiliary cooling equipment. The power electronics 218 for the turboexpander 202 combines a Variable Speed Drive (VSD) 232 and Magnetic Bearing Controller (MBC) 234 into one cabinet, in some implementations. The VSD 232 allows for a consistent and clean delivery of generated power from the turboexpander 202 to the electrical component 240. For example, the VSD 232 regulates the frequency and/or amplitude of the generated current to match the frequency and/or amplitude of the electrical component 240. After expansion, the gas fuel exits the turboexpander 202 along the same axial path for downstream processes, such as to join a fuel flow to a fuel cell stack (e.g., fuel cell stack 104 of FIG. 1).

The turboexpander 202 includes a flow-through configuration. The flow-through configuration permits gas fuel to flow from an inlet side of the turboexpander 202 to an outlet side of the turboexpander 202. The gas fuel flows into a radial gas inlet 254 to the turbine wheel 204 and an axial gas outlet 256 from the turbine wheel 204. The gas then flows through the generator and out of the outlet 252, where the gas rejoins the fluid pathway 270 (e.g., fluid pathway 108 of FIG. 2). Generally, high pressure hydrogen gas 220 is directed to flow into the turboexpander 202 through a flow control system 226. The flow control system 126 includes a flow or mass control valve and an emergency shut off valve. In embodiments, the turboexpander housing 112 is hermetically sealed. In certain instances, the example turboexpander generator system 200 excludes the flow control valve 226.

The high pressure hydrogen gas 220 is expanded by flowing through the turbine wheel 204, resulting in a pressure letdown of the hydrogen gas. Lower pressure hydrogen gas 228 exits the turboexpander 202. The expansion of the high pressure hydrogen gas 220 through the turbine wheel 204 causes the turbine wheel 204 to rotate, which causes the rotor 208 to rotate. The rotation of the rotor 208 within the stator 210 generates electrical energy. The turboexpander 202 achieves the desired pressure letdown and captures the energy from the pressure letdown to generate electricity. A pressure control valve 230, such as a conventional pressure regulator, can be installed in parallel to the turboexpander 202. The pressure control valve 230 can be used to control the pressure of the high pressure hydrogen gas 220 that flows parallel to the turboexpander 202. Any excess high pressure hydrogen gas that is not directed into the turboexpander 202 can be directed through the pressure control valve 130.

The turboexpander 202 includes a turbine wheel 204. The turbine wheel 204 is shown as a radial inflow turbine wheel, though other configurations are within the scope of this disclosure, such as axial flow turbine wheels. In this example, high pressure hydrogen gas 224 is received from an inlet conduit 250 of the housing 212 and enters a radially oriented inlet 254 of the turbine wheel 204. In certain embodiments, the fluid flows through an inlet conduit 250 and is diverted by a flow diverter 258 to a radial inlet 254 that directs the flow into the radial inflow of the turbine wheel 204. In the example turboexpander 202 of FIG. 2, the flow diverter 258 includes a cone-shaped nose that diverts the gas flow radially outward to the radial inlet 254. The flow diverter 258 can be connected to or integrally formed with the bearing 216a and sensor 217a at the inlet side of the turboexpander 202 and the supports for this bearing 216a and sensor 217a surrounding the axial end of the rotor 208 at the inlet end of the turboexpander 202. After expanding, the lower pressure hydrogen gas exits the turbine wheel 204 from an axially oriented outlet 256 to outlet conduit 252 of the housing 212 at the outlet end of the turboexpander 202.

The turbine wheel 204 can be directly affixed to the rotor 208, or to an intermediate common shaft, for example, by fasteners, rigid drive shaft, welding, or other manner. For example, the turbine wheel 204 may be received at an axial end of the rotor 208, and held to the rotor 208 with a shaft. The shaft threads into the rotor 208 at one end, and at the other end, captures the turbine wheel 204 between the end of rotor 208 and a nut threadingly received on the shaft. The turbine wheel 204 and rotor 208 can be coupled without a gearbox and rotate at the same speed. In other instances, the turbine wheel 204 can be indirectly coupled to the rotor 208, for example, by a gear train, clutch mechanism, or other manner.

The turbine wheel 204 includes a plurality of turbine wheel blades 206 extending outwardly from a hub and that react with the expanding process gas to cause the turbine wheel 204 to rotate. FIG. 2 shows an unshrouded turbine wheel, in which each of the turbine blades 206 has an exposed, generally radially oriented blade tip extending between the radial inlet 254 and axial outlet 256. As discussed in more detail below, the blade tips substantially seal against a shroud 214 on the interior of the housing 212. In certain instances, the turbine wheel 204 is a shrouded turbine wheel.

In configurations with an un-shrouded turbine wheel 204, the housing 212 includes an inwardly oriented shroud 214 that resides closely adjacent to, and at most times during operation, out of contact with the turbine wheel blades 206. The close proximity of the turbine wheel blades 206 and shroud 214 substantially seals against passage of hydrogen gas therebetween, as the hydrogen gas flows through the turbine wheel 204. Although some amount of the gas may leak or pass between the turbine wheel blades 206 and the shroud 214, the leakage is insubstantial in the operation of the turbine wheel 204. In certain instances, the leakage can be commensurate with other similar unshrouded-turbine/shroud-surface interfaces, using conventional tolerances between the turbine wheel blades 206 and the shroud 214. The amount of leakage that is considered acceptable leakage may be predetermined. The operational parameters of the turbine generator may be optimized to reduce the leakage. In embodiments, the housing 212 is hermetically sealed to prevent process gases from escaping the radial inlet 254 of the turbine wheel 204.

The shroud 214 may reside at a specified distance away from the turbine wheel blades 206, and is maintained at a distance away from the turbine wheel blades 206 during operation of the turboexpander 202 by using magnetic positioning devices, including active magnetic bearings and position sensors.

Bearings 216a and 216b are arranged to rotatably support the rotor 108 and turbine wheel 204 relative to the stator 210 and the shroud 214. The turbine wheel 204 is supported in a cantilevered manner by the bearings 216a and 216b. In embodiments, the turbine wheel 204 may be supported in a non-cantilevered manner and bearings 216a and 216b may be located on the outlet side of turbine wheel 204. In certain instances, one or more of the bearings 216a or 216b can include ball bearings, needle bearings, magnetic bearings, foil bearings, journal bearings, or other bearing types.

Bearings 216a and 216b may be a combination radial and thrust bearing, supporting the rotor 208 in radial and axial directions. Other configurations could be utilized. The bearings 216a and 216b need not be the same types of bearings.

In the embodiments in which the bearings 216a and 216b are magnetic bearings, a magnetic bearing controller (MBC) 234 is used to control the magnetic bearings 216a and 216b. Position sensors 217a, 217b can be used to detect the position or changes in the position of the turbine wheel 204 and/or rotor 208 relative to the housing 212 or other reference point (such as a predetermined value). Position sensors 217a, 217b are connected to the housing 212 directly or indirectly, and the position sensors 217a, 217b can detect axial and/or radial displacement of the rotor 208 and its connected components (e.g., turbine wheel 204) relative to the housing 212. The magnetic bearing 216a and/or 216b can respond to the information from the positions sensors 217a, 217b and adjust for the detected displacement, if necessary. The MBC 234 may receive information from the position sensor(s) 217a, 217b and process that information to provide control signals to the magnetic bearings 216a, 216b. MBC 234 can communicate with the various components of the turboexpander 202 across a communications channel 262.

The use of magnetic bearings 216a, 216b and position sensors 217a, 217b to maintain and/or adjust the position of the turbine wheel blades 206 such that the turbine wheel blades 206 stay in close proximity to the shroud 214 permits the turboexpander 202 to operate without the need for seals (e.g., without the need for dynamic seals). The use of the active magnetic bearings 216a,b in the turboexpander 202 eliminates physical contact between rotating and stationary components, as well as eliminate lubrication, lubrication systems, and seals.

The turboexpander 202 may include one or more backup bearings. For example, at start-up and shut-down or in the event of a power outage that affects the operation of the magnetic bearings 216a and 216b, bearings may be used to rotatably support the turbine wheel 204 during that period of time. The backup bearings and may include ball bearings, needle bearings, journal bearings, or the like.

As mentioned previously, the turboexpander 202 is configured to generate electricity in response to the rotation of the rotor 208. In certain instances, the rotor 208 can include one or more permanent magnets coupled to the rotor 208, for example, on a radially outer surface of the rotor 208 adjacent to the stator 210. The stator 210 includes a plurality of conductive coils, for example, positioned adjacent to the magnet(s) on the rotor 208. Electrical current is generated by the rotation of the magnet(s) within the coils of the stator 210. The rotor 208 and stator 210 can be configured as a synchronous, permanent magnet, multiphase alternating current (AC) generator. The electrical output 260 can be a three-phase output, for example. In certain instances, stator 210 may include a plurality of coils (e.g., three or six coils for a three-phase AC output). When the rotor 208 is rotated, a voltage is induced in the stator coil. At any instant, the magnitude of the voltage induced in the coils is proportional to the rate at which the magnetic field encircled by the coil is changing with time (i.e., the rate at which the magnetic field is passing the two sides of the coil). In instances where the rotor 208 is coupled to rotate at the same speed as the turbine wheel 204, the turboexpander 202 is configured to generate electricity at that speed. Such a turboexpander 202 is what is referred to as a "high speed" turbine generator. For example, in embodiments, the turboexpander 202 can produce up to 135 kilowatts (kW) of power at a continuous speed of 25,000 revolutions per minute (rpm) of the rotor 208. In embodiments, the turboexpander 202 can produce on the order of 315 kW at certain rotational speeds (e.g., on the order of 23,000 rpm).

In some embodiments, the design of the turbine wheel 204, rotor 208, and/or stator 210 can be based on a desired parameter of the output gas from the turboexpander 202. For example, the design of the rotor 208 and stator 210 can be based on a desired temperature of the gas 228 at input of the turboexpander 202, output of the turboexpander 202, or both. The turboexpander generator 200 outputs the depressurized second amount of fuel at an output temperature that is cooler than the first amount of depressurized fuel. For example, the turboexpander generator 200 can output the depressurized second amount of hydrogen fuel at a temperature as low as −185 C. The outlet temperature can be controlled through the design of the turbine wheel 204. For example, a desired output temperature can be achieved by the design of the outer diameter of the stator 210 and/or outlet nozzle 252, the inner diameter of the stator 210 and/or outlet nozzle 252, the outer diameter of the rotor 208, the outer diameter of the eye tip of the exducer of the turbine wheel blades 106, the outer diameter of the eye root of the exducer of the turbine wheel blades 106, the exit flow angle from the stator 210, the entry flow angle to the rotor 208, the exducer root angle, the exducer tip angle, the depth of the channel at the radial inlet 254 of the rotor 208, other features, or a combination of these features. In some examples, by modifying and determining these geometries and parameters, the isentropic efficiency of the pressure reduction can be changed to a desired efficiency, which affects the outlet temperature such that when the isentropic efficiency is higher, the outlet temperature is lower, and when the isentropic efficiency is lower, the outlet temperature is higher.

In the example system 200 of FIG. 2, the turboexpander 202 is coupled to power electronics 218. Power electronics 218 includes the variable speed drive (VSD) 232 (or variable frequency drive) and the magnetic bearing controller (MBC) 234 (discussed above).

The electrical output 260 of the turboexpander 202 is connected to the VSD 232, which can be programmed to specific power requirements. The VSD 232 can include an insulated-gate bipolar transistor (IGBT) rectifier 236 to convert the variable frequency, high voltage output from the turboexpander 202 to a direct current (DC). The rectifier 236 can be a three-phase rectifier for three-phase AC input current. An inverter 238 then converts the DC from the rectifier AC for supplying to the electrical component 140, such as a motor for a fuel cell vehicle, a power grid, a battery, or other component. The inverter 238 can convert the DC to 380 VAC-480 VAC at 50 to 60 Hz for delivery to the component. The specific output of the VSD 232 depends on the power grid and application. Other conversion values are within the scope of this disclosure. The VSD 232 matches its output to the electrical component 240 (e.g., power grid, battery, or other) by sampling the voltage and frequency of the electrical component 240, and then changing the output voltage and frequency of the inverter 238 to match the sampled voltage and frequency.

The turboexpander 202 is also connected to the MBC 234 in the power electronics 218. The MBC 234 constantly monitors position, current, temperature, and other parameters to ensure that the turboexpander 202 and the active magnetic bearings 216a and 216b are operating as desired. For example, the MBC 234 is coupled to position sensors 217a, 217b to monitor radial and/or axial position of the turbine wheel 204 and the rotor 208. The MBC 234 can control the magnetic bearings 216a, 216b to selectively change the stiffness and damping characteristics of the magnetic bearings 216a, 216b as a function of spin speed. The MBC 234 can also control synchronous cancellation, including automatic balancing control, adaptive vibration control, adaptive vibration rejection, and unbalance force rejection control.

Figure 3:
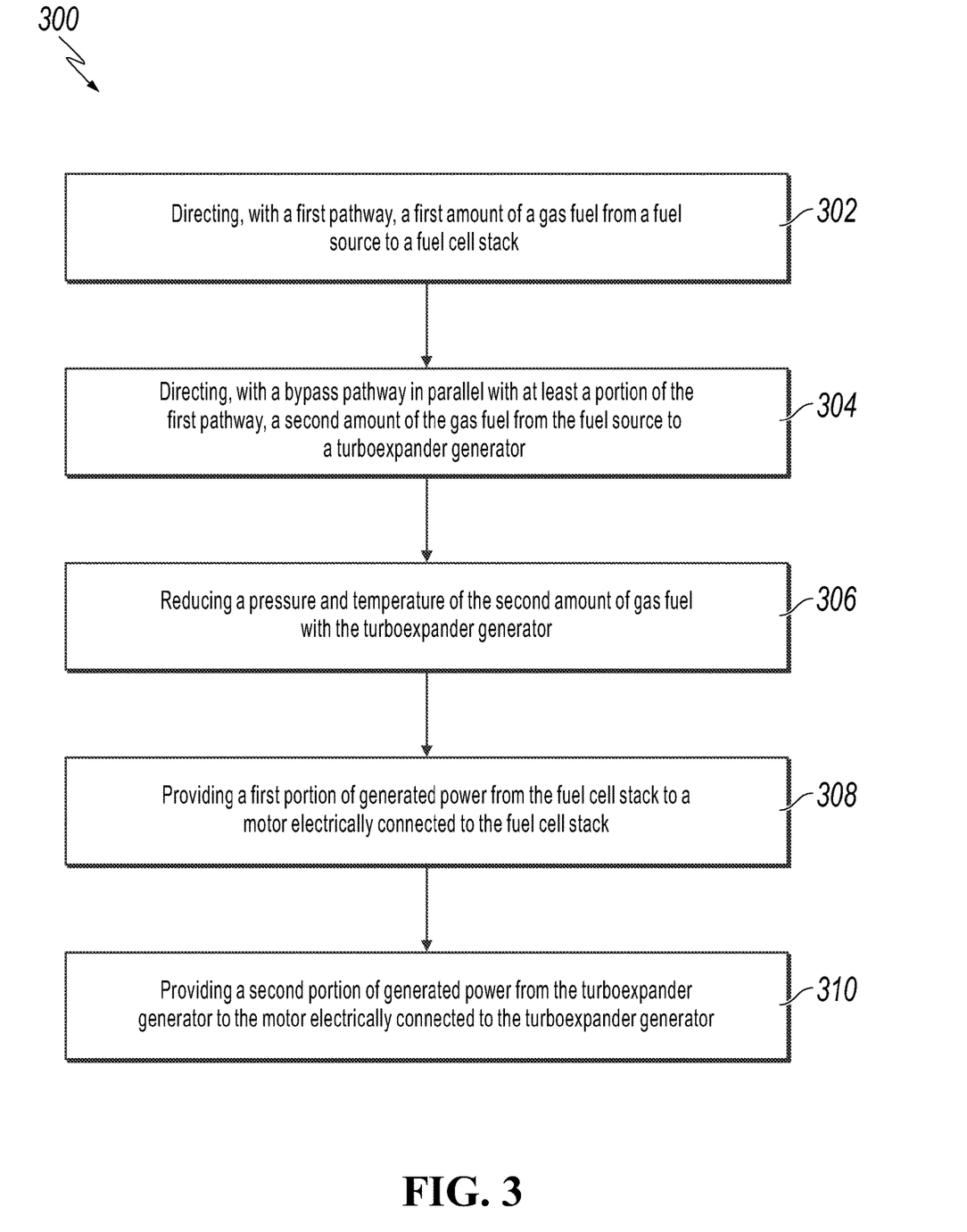
FIG. 3 is a flowchart describing an example method for providing fuel to a fuel cell stack.

FIG. 3 is a flowchart describing an example method 300 for providing fuel to a fuel cell stack, for example, performed by the fuel cell system 100 of FIG. 1. At 302, a first amount of a gas fuel is directed through a first pathway from a fuel source to a fuel cell stack. At 304, a bypass pathway, in parallel with at least a portion of the first pathway, directs a second amount of the gas fuel from the fuel source to a turboexpander generator. At 306, a pressure and temperature of the second amount of gas fuel is reduced with the turboexpander generator. At 308, a first portion of generated power from the fuel cell stack is provided to a motor that is electrically connected to the fuel cell stack. At 310, a second portion of generated power from the turboexpander generator is provided to the motor electrically that is connected to the turboexpander generator.

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. A fuel cell system, comprising:
   a gas fuel source;
   a fuel cell stack fluidly connected to the gas fuel source by a first pathway, the first pathway configured to transmit a first amount of gas fuel from the gas fuel source to the fuel cell stack;
   a turboexpander generator fluidly connected to the gas fuel source by a bypass pathway in parallel with at least a portion of the first pathway, the turboexpander generator to receive a second amount of gas fuel from the gas fuel source and reduce a pressure and temperature of the second amount of the gas fuel, the bypass pathway fluidly coupled to the first pathway downstream of the turboexpander generator, and the bypass pathway configured to return the second amount of the gas fuel from the turboexpander generator to the first pathway; and
   a motor electrically connected to the fuel cell stack and the turboexpander generator, the fuel cell stack and the turboexpander generator each configured to supply electrical power to the motor.

2. The fuel cell system of claim 1, wherein the turboexpander generator comprises:
   a turbine wheel configured to receive the second amount of the gas fuel and rotate in response to expansion of the second amount of the gas fuel flowing into an inlet of the turbine wheel and out of an outlet of the turbine wheel,
   a rotor coupled to the turbine wheel and configured to rotate with the turbine wheel,
   a stationary stator, the turboexpander generator to generate an alternating current upon rotation of the rotor within the stator; and
   a power electronics system electrically connected to an electrical output of the stationary stator and to receive alternating current from the stationary stator.

3. The fuel cell system of claim 2, wherein the power electronics system is electrically connected to the motor to provide the alternating current to the motor.

4. The fuel cell system of claim 3, wherein the power electronics system comprises a variable speed drive to control the alternating current to the motor.

5. The fuel cell system of claim 1, further comprising a controller communicably coupled to the gas fuel source, the controller to control the first amount of gas fuel directed to the fuel cell stack and the second amount of gas fuel directed to the turboexpander generator.

6. The fuel cell system of claim 1, wherein the bypass pathway downstream of the turboexpander generator is fluidly connected to a heat exchange system, the heat exchange system configured to cool the fuel cell stack.

7. The fuel cell system of claim 6, wherein the heat exchange system comprises a coolant pump and a heat exchanger, the second amount of the gas fuel configured to cool a coolant fluid of the heat exchange system.

8. The fuel cell system of claim 1, wherein the fuel cell stack comprises a proton-exchange membrane fuel cell.

9. The fuel cell system of claim 1, wherein the first pathway comprises a pressure reduction valve configured to reduce a pressure of the first amount of the gas fuel.

10. The fuel cell system of claim 1, wherein the gas fuel source comprises a hydrogen tank, and the gas fuel comprises hydrogen.

11. A method for providing fuel to a fuel cell stack, the method comprising:
    directing, with a first pathway, a first amount of a gas fuel from a fuel source to a fuel cell stack;
    directing, with a bypass pathway in parallel with at least a portion of the first pathway, a second amount of the gas fuel from the fuel source to a turboexpander generator;
    reducing a pressure and temperature of the second amount of gas fuel with the turboexpander generator, wherein the reducing comprises:
      directing the second amount of gas fuel to a turbine wheel of the turboexpander generator;
      driving rotation of the turbine wheel with the second amount of gas fuel; and
      in response to rotating the turbine wheel, generating electrical current by an electric generator of the turboexpander generator;
    providing a first portion of generated power from the fuel cell stack to a motor electrically connected to the fuel cell stack; and
    providing a second portion of generated power from the turboexpander generator to the motor electrically connected to the turboexpander generator.

12. The method of claim 11, wherein providing the second portion of generated power from the turboexpander generator to the motor comprises:
    directing electrical current generated by the electric generator to a power electronics; and
    delivering the generated electrical current from the power electronics to the motor.

13. The method of claim 11, comprising controlling, with a controller, the first amount of the gas fuel to the fuel cell stack and the second amount of the gas fuel to the turboexpander generator.

14. The method of claim 13, wherein controlling the first amount of the gas fuel and the second amount of the gas fuel comprises determining the first amount of gas fuel and the second amount of gas fuel based on a temperature of the fuel cell stack.

15. The method of claim 14, wherein the controlling comprises:
    determining that the temperature of the fuel cell stack is above a first temperature threshold; and
    in response to determining that the temperature is above the first temperature threshold, decreasing the first amount of gas fuel to the fuel cell stack and increasing the second amount of gas fuel to the turboexpander generator.

16. The method of claim 14, wherein the controlling comprises:
    determining that the temperature of the fuel cell stack is below a second temperature threshold; and
    in response to determining that the temperature is below the second temperature threshold, increasing the first amount of gas fuel to the fuel cell stack and decreasing the second amount of gas fuel to the turboexpander generator.

17. The method of claim 11, comprising, after reducing the pressure and temperature of the second amount of gas fuel with the turboexpander generator, directing the second amount of gas fuel to a heat exchange system of the fuel cell stack to cool a coolant fluid of the heat exchange system.

18. A fuel cell system for a vehicle, comprising:
a hydrogen fuel source;
a proton-exchange membrane fuel cell stack fluidly connected to the hydrogen fuel source by a first pathway, the first pathway configured to transmit a first amount of hydrogen fuel from the hydrogen fuel source to the fuel cell stack; and
a turboexpander generator fluidly connected to the hydrogen fuel source by a bypass pathway in parallel with at least a portion of the first pathway, the turboexpander generator to receive a second amount of hydrogen fuel from the hydrogen fuel source and reduce a pressure and temperature of the second amount of the hydrogen fuel, the bypass pathway fluidly coupled to the first pathway downstream of the turboexpander generator, and the bypass pathway configured to return the second amount of the hydrogen fuel from the turboexpander generator to the first pathway.

\* \* \* \* \*